United States Patent Office 2,883,356
Patented Apr. 21, 1959

2,883,356

COMPOSITION CONTAINING A PLASTIC MATERIAL AND A MODIFIED CLAY

Earl W. Gluesenkamp, Dayton, Ohio, assignor to Monsanto Chemical Company, St. Louis, Mo., a corporation of Delaware No Drawing. Application May 27, 1953
Serial No. 357,917

23 Claims. (Cl. 260—37)

This invention relates to plastic polymeric organic materials. In one aspect the invention pertains to such materials having incorporated therein an adduct of an anionic polymer with clay or other ion-exchange type solid.

It is often desirable for industrial purposes to incorporate into various types of plastic materials, natural and synthetic, finely divided solid materials which either act as fillers or extenders, or which markedly alter the characteristics of the said plastics. As an important example, rubber, both natural and synthetic, is admixed with solids which act as fillers or extenders, or more desirably as reinforcing agents by increasing the stiffness of the rubber. Thermoplastic and thermosetting synthetic resins often require fillers for economical reasons, opacifiers, pigments, and the like. Textile fibers, including artificial fibers such as rayon, nylon (long-chain synthetic polymeric amides which have recurring amide groups as an integral part of the main polymer chain and which are capable of being formed into oriented filaments), acrylic fibers and the like often have opacifiers incorporated therein and/or are treated with finely divided solids for the purpose of improving the twist strength or other properties thereof.

In accordance with various embodiments of the present invention, plastic solids, including the foregoing, are treated and/or admixed with adducts formed by reaction between (a) an inorganic solid that is gel-forming in water and/or possess ion-exchange like properties and (b) an anionic polymer containing a substantially linear carbon molecular chain derived by the polymerization of at least one monoolefinic compound through aliphatic unsaturation. Said anionic polymers are herein termed "polyanions." The invention is particularly concerned with synthetic water-soluble polyelectrolytes that are linear polymers containing carboxyl groups, which polymers are anionic in aqueous solutions.

I have found that adducts of ion-exchange type solids with polyanions have the ability to modify in favorable ways the properties of high molecular weight polymeric materials of a plastic nature. The polyanion significantly alters the surface characteristics of the clay or other ion-exchange type solid. For example, admixture of bentonite with rubber does not significantly increase the modulus (stiffness) of the rubber. However, if such bentonite is reacted with a high molecular weight polyanion, even in an amount less than 1 weight percent polyanion based on the bentonite, such as polyacrylic acid made by hydrolysis of polyacrylonitrile, the resulting bentonite-polyanion adduct has excellent reinforcing properties when admixed with the rubber. Adducts of the nature described herein are in general more readily incorporated in and more compatible with polymeric materials. Thermoplastic resins, such as polystyrene, are advantageously admixed with adducts of the nature described which act as fillers and extenders. The adducts can similarly be used in thermosetting resins, such as phenol-aldehyde, melamine-formaldehyde, or urea-formaldehyde resins. It may be speculated that the modification of the clay surface caused by its reaction with anionic high polymer gives the clay a greater affinity for organic plastics, although it is by no means certain that this theory explains the results obtained. Mixtures of plastics with adducts of polyanions and ion-exchange type solids made in accordance with the present invention have numerous advantages. Thus, particularly in the case of copolymers of unsaturated aliphatic carboxylic acids or salt forming derivatives thereof and copolymerizable monomers, e.g., copolymers of vinyl acetate with monosodium maleate, large amounts of organic material can be bound to the ion-exchange type solid, since the anionic group in the polymer can carry with it a high percentage of non-ionic organic material. The polyanions derived by polymerization of at least one monolefinic compound through aliphatic unsaturation are, when adducted with an ion-exchange type solid, extremely stable and resistant to cleavage of carbon chain by thermal or chemical means. These polyanions are bound intimately to the active surface of the clay or other ion-exchange type solid.

It will be appreciated of course that not all adducts of ion-exchange type solids with polyanions will be full equivalents when used with all types of plastic materials. Those skilled in the art, having been given the benefit of the present disclosure, will readily ascertain which combinations of ion-exchange type solid, polyanion, and plastic give the desired effect in any particular instance.

In accordance with preferred aspects of the invention, organic plastic materials are admixed with and thereby have their properties modified by adducts of the nature described. In preparing such adducts, inorganic solids that are gel-forming in water and/or that possess ion-exchange like properties, e.g., clays, silica gel, alumina, are reacted with anionic polymers containing a substantially linear carbon molecular chain derived by the polymerization of at least one monoolefinic compound through aliphatic unsaturation. These materials with which the inorganic solid is reacted are herein termed "polyanions." These polyanions are high polymers which in water undergo electrolytic dissociation to give a negatively charged polymer. The polyanions to be used preferably have a molecular weight of at least 10,000, and molecular weights above 15,000, are usually preferred. The molecular weight of suitable polyanions is often in the range of 50,000 to 100,000, and even higher. However, low molecular weight polyanions can be used in some instances, for example those having a molecular weight of say 5,000 or less preferably as low as 2,000 or even lower. Molecular weights referred to herein are those determined by the light scattering method described by Debye, Journal of Physics and Colloid Chemistry 51, 18 (1947). Molecular weights determined by the light scattering method are weight average molecular weights; see Zimm and Doty, Journal of Chemical Physics 12, 203 (1944). In practicing this invention the polyanions are believed to become bound to the surfaces of the clay or other solid by rather strong forces, probably at least partly because of the ordered arrangement of the anionic groups in a single polymer molecule.

Polyanions with which the invention is principally concerned are those continuous carbon chain skeleton polymers having a plurality of recurring carboxylic acid salt groups in the molecule such that upon dissolution or suspension in water the polymer becomes a negatively charged molecule or particle.

The polyanions are interacted with materials of the nature of hydrophilic substances that have ion-exchange capacity either in the sense of ion-exchange clays or which act in that manner, many of which are also gel-forming in water. Generally speaking a solid that undergoes an ion-exchange type of reaction is used, commonly referred to as ion-exchange adsorbent materials. Among the materials that can be used are hydrophilic inorganic materials having high surface area and capable of taking up polyanions by an apparent chemical bond by virtue of an anion exchange reaction or a phenomenon which resembles anion exchange reaction, or in some cases perhaps solely by physical adsorption. Suitable hydrophilic inorganic materials include those forming a gel in water such as oxides (including hydroxides) of alkaline earth metals and polyvalent metals such as aluminum, iron, vanadium; certain phosphates, sulfides and sulfates of heavy metals in gel form; silica, especially silica xerogels and aerogels and diatomaceous earth. Artificial and naturally occurring aluminum silicates and modified aluminum silicates are desirable, especially naturally occurring clays. Of the latter, special note is made of kaolinite, bentonite, hectorite, beidellite, attapulgite, nontronite, saponite. Asbestos, a naturally occurring magnesium calcium silicate, is useful.

When a naturally occurring clay is to be used, it is preferred that it be from a deposit which is essentialy pure clay, or that it be subjected to known purification treatments to free it from non-clay material and produce an essentially pure clay, e.g., a material which is at least 95 weight percent clay. A conventional treatment involves suspension of impure mined clay in water, settling of non-clay impurities (sand, silt, etc.) and a separation of the settled impurities from the clay suspension; such suspension can then be used directly for reaction with polyanion or the clay can be separated and dried for later use in reacting with polyanion.

It has been found, in tests on typical expanding lattice clays, e.g., bentonite, that polyanions do not adsorb on the surface of the clay platelets. However, it has also been definitely established that polyanions are adsorbed by such clays, and it is believed that this adsorption is by anion exchange mechanism at anion exchange sites on the edges of the clay platelets. It is postulated that such exchange sites exist on aluminum atoms that become exposed upon breaking of the regular plate structure when an individual clay platelet is first formed. Such adsorption of polyanion from aqueous solutions occurs also with clays that are not of the expanding lattice type, e.g., kaolinite. This is consistent with the belief that the adsorption is at least partly by anion exchange mechanism, since kaolinite, for example, has one layer of aluminum atoms for each layer of silicon atoms, as contrasted with one layer of aluminum atoms for every two layers of silicon atoms in montmorillonite, and thus probably has even greater anion exchange capacity.

Adsorption of polyanions to make adducts used in accordance with the present invention is facilitated by the presence of extraneous electrolytes dissolved in the aqueous solution. Such electrolytes should be simple salts such as sodium chloride, etc., and often sufficient electrolyte is present merely from the starting clay material and/or from ordinary industrial water that can be used in preparing the adducts. In the case of inorganic gel-forming materials other than clays, e.g., alumina, silica, etc. the mechanism of adduct formation is not necessarily explainable by an anion exchange mechanism. However, in the case of non-clay alumina-containing materials, such as alumina, aluminum hydroxide, and the like, it is reasonable to believe that much the same type of action occurs as with clays as described above. For the purpose of the present invention, an explanation based on simple physical adsorption is acceptable and the term "adduct" is to be construed broadly as meaning a combination of polyanion with solids of the nature described herein regardless of the mechanism involved. As will be described in more detail below, the adducts includes those made from a solid plus only that quantity of polyanion which is readily and quickly adsorbed thereon, or can include a considerably larger portion of anion which may or may not become as firmly bound to the solid as that portion which is readily adsorbed thereon.

The words "hydrophilic" and "hydrophobic" are used herein to refer to the wettability and non-wettability of a substance by water. Considering for example kaolinite, it may be thought of in one sense as hydrophobic, since water does not penetrate throughout the molecule to form a solution, as water with gelatin for instance. However, kaolinite is easily wet by water and tends to swell at least to a slight extent in water, so it is considered to be hydrophilic as the term is used herein. In preparing adducts for use in the practice of the present invention, hydrophilic substances are made (by reaction with polyanions) hydrophobic, manifested by an increased resistance towards wetting by water.

I prefer to employ in the present invention adducts made from alumina-containing hydrophilic solids of the nature discussed herein, particularly aluminum silicates, including clays, and hydrous aluminum oxide and hydroxide.

Useful synthetic polyanions employed herein include polymerization products of $\alpha$-unsaturated aliphatic carboxylic acids or salt-forming derivatives thereof. Examples of such polymerization products are the homopolymers of the acids of the acrylic series, such for example as polyacrylic acid, and polyalkacrylic acids, of which polymethacrylic acid, polyethylacrylic acid, etc. are examples. Also included are the copolymers of acids of the acrylic series and polymerizable vinyl compounds, such for example as styrene, vinyl formate, vinyl acetate, vinyl chloride, vinyl methyl ether, etc. Also included are interpolymers of $\alpha,\beta$-unsaturated dicarboxylic acids, such as maleic acid, maleic anhydride, citraconic acid, etc. with the above mentioned vinyl compounds. The polymers of carboxylic acids are ordinarily used in the form of water-soluble salts thereof, e.g., the alkali metal, alkaline earth metal, ammonium, amine, etc. salts.

One type of polyanion useful in the practice of the invention is the equimolar copolymer of a polycarboxylic acid derivative and at least one other monomer copolymerizable therewith. The polycarboxylic acid derivative may be maleic anhydride (subsequently hydrolyzed), maleic acid, fumaric acid, itaconic acid, citraconic acid, aconitic acid, the partial amides of these acids, the alkali metal, alkaline earth metal and ammonium salts of these acids, the partial alkyl esters, salts of the partial alkyl esters and the substituted partial amides of these polycarboxylic acids. The carboxylic acid and carboxylic acid salt radicals are ionizable groups which contribute to the hydrophilic properties and tend to make the polymers water-soluble. The hydrophilic properties may be entirely, or in part, due to the comonomer when acrylic acid, acrylic acid salts of alkali metals and ammonium, and the corresponding derivatives of methacrylic, crotonic or other polymerizable acids are used. Thus, a copolymer of a dialkyl maleate and acrylic acid will be a water-soluble polyanion. When the hydrophilic maleic acid derivatives are used, hydrophobic comonomers may be used, for example ethylene, propylene, isobutylene, styrene, $\alpha$-methylstyrene, vinyl acetate, vinyl chloride, vinyl formate, vinyl alkyl ethers, alkyl acrylates and alkyl methacrylates. In the practice of this invention the dibasic polybasic acid derivatives of the copolymers may be maleic acid, maleic anhydride (subsequently hydrolyzed), sodium maleate, potassium maleate, ammonium maleate, calcium maleate, monosodium maleate, monopotassium maleate, monoammonium maleate, monocalcium maleate, and a monoalkyl maleate, the partial amide of maleic acid, the N-alkyl substituted partial maleic acid amide, the N-aminoethyl partial maleamide, the alkyl-aminoalkyl partial maleamides, and the corresponding derivatives of itaconic, citraconic, fumaric and aconitic acids. Any of the said polybasic acid derivatives may be copolymerized with any of the other monomers described above, and any other which forms a copolymer with dibasic acid derivatives in equimolar proportions. The polybasic acid derivatives may be copolymers with a plurality of comonomers, in which case the total molar proportions of the comonomers will be equimolar with respect to the polybasic acid derivatives. Although these copolymers may be prepared by direct polymerization of the various monomers, frequently they are more easily prepared by an after reaction of other copolymers. For example, copolymers of maleic anhydride and another monomer may be converted to maleic acid copolymers by reaction with water and to metal salt copolymers by reaction with alkali metal compounds, alkaline earth metal compounds or ammonium compounds.

Certain of the hydrophilic derivatives of unsaturated polycarboxylic acids may be polymerizable in less than equimolar proportions with certain of the less hydrophobic comonomers, for example vinyl formate and vinyl acetate, or with monomers with ionizable groups, such as acrylic acid, the alkali metal and ammonium salts of acrylic acid, acrylamides, and the various N-substituted acrylamides, methacrylic acid, the alkali metal and ammonium salts of methacrylic acid, methacrylamide and the various N-substituted methacrylamides, crotonic acids and the alkali metal and ammonium salts of crotonic acids, the crotonamides and the N-substituted crotonamides, vinylsulfonic acid, and vinyl phosphonic acid. The hydrophilic derivatives of polycarboxylic acids include the half-alkyl esters of maleic acid, and the partial alkyl esters of fumaric, itaconic, citraconic and aconitic acids. When less than 50 mole percent of these hydrophilic polybasic acid derivatives are used, and especially with the hydrophobic monomers, such as vinyl acetate and vinyl formate, the minimum proportion of polybasic acid derivative is that which will render the copolymer water-soluble.

Another modification of the copolymers of the various unsaturated polycarboxylic acid derivatives are those wherein more than 50 mole percent of the polycarboxylic acid derivative is copolymerized therein. This type of which fumaric acid and itaconic acid are examples of the hydrophilic monomer may involve a wide variation with respect to the non-hydrophilic monomer, ethylene, propylene, isobutylene, styrene, α-methylstyrene, vinyl acetate, vinyl formate, vinyl alkyl ethers, alkyl acrylates, and alkyl methacrylates being useful. If desired, the comonomer may be one which contributes to the hydrophilic property, for example vinyl alcohols, acrylic acid, methacrylic acid, acrylamide, methacrylamide and the various amides which have alkyl, aminoalkyl, or alkylaminoalkyl substituents on the nitrogen atom. The proportions of these various comonomers contemplate the use of more than 50 mole percent of the polybasic acid derivative and less than 50 mole percent of the comonomer. The comonomer may be used in relatively small proportions, depending upon the hydrophilic or hydrophobic nature of the comonomer; sufficient total hydrophilic groups in both monomers must be present to render the resultant copolymer soluble in water under the conditions of use. This type of copolymer may involve a plurality of the polycarboxylic acid derivative and/or a plurality of the comonomers.

Other suitable polyanionic polymers are the polymers of acrylic or methacrylic acid derivatives, for example acrylic acid, the alkali metal, ammonium and amine salts of acrylic acid, methacrylic acid and the alkali metal, ammonium and amine salts of methacrylic acid. These polymeric compositions may be the homopolymers or they may be copolymers with other copolymerizing monomers such as ethylene, propylene, isobutylene, styrene, α-methylstyrene, vinyl acetate, vinyl formate, vinylalkyl ethers, acrylonitrile, methacrylonitrile, vinyl chloride, vinylidene chloride, the alkyl acrylates, the alkyl methacrylates, the alkyl maleates and the alkyl fumarates and other olefinic monomers copolymerizable therewith. The copolymers of this type, having at least 50 mole percent of the acrylic or methacrylic acid derivatives, are preferred, and especially when the comonomer is hydrophobic or has no ionizable groups. Polymers of this type may be prepared directly by the polymerization of suitable monomers, or by the after chemical reaction of other polymers, for example by the hydrolysis of acrylonitrile or methacrylonitrile polymers.

Another class of polymeric polyanions are the polymers of vinylsulfonic acid, and the copolymers of vinylsulfonic acid with one or more polymerizable organic monomers, for example vinyl chloride, acrylonitrile, styrene, vinyl acetate and other polymerizable monoolefinic compounds. Although the polymers and copolymers of vinylsulfonic acid may be prepared by direct polymerization, they are more easily prepared by indirect methods. For example, polymers and copolymers of vinylsulfonyl chloride may be first prepared and then hydrolyzed for conversion into vinylsulfonic acid polymers, the vinylsulfonic acid salt polymers, and other vinylsulfonic acid derivatives capable of ionization in aqueous solutions. Another useful indirect method of preparing this class of polymeric polyanions involves the preparation of polymers of unsaturated hydrocarbons, for example ethylene, propylene, isobutylene, styrene, α-methylstyrene, and others, or the copolymers of the said unsaturated hydrocarbons and other polymerizable monoolefinic compounds such as vinyl chloride, acrylonitrile, vinyl acetate, methyl methacrylate, alkyl acrylates and others, and thereafter introducing the sulfonic acid nuclei by a conventional sulfonation reaction. The sulfonic acid groups so introduced may be converted to sulfonic acid salts or other anionic grouping. The copolymers of this type may involve the use of a plurality of sulfonic acid monomers and/or a plurality of the conventional comonomers as described.

As described above in connection with the various types of polyanionic polymers suitable for the practice of this invention, the hydrophilic polymer may be prepared directly by the polymerization or copolymerization of one or more of the various available organic monomers with aliphatic unsaturation, if the said compounds contain a hydrophilic group, for example carboxyl groups. Generally, more types of polyanionic polymers can be prepared by subsequent reactions of polymers and copolymers. For example, polymers containing nitrile groups may be hydrolyzed to form water-soluble carboxy-containing polymers. Polyvinyl alcohol, not in itself a polyanion, may be converted into polyanions by esterification with dibasic acids, one of said carboxylic acid groups reacting with the alcohol radical and the other providing the hydrophilic characteristics by a carboxy group on the side chain. Active halogen atoms may be reacted with bisulfite to substitute sulfonic acid groups for the reactive halogens. Other types of polymers prepared by the subsequent reaction of previously prepared polymers have been explained above in connection with the sulfonic acid and sulfonic acid salts of polymeric hydrocarbons.

Polymers and copolymers are identified herein in terms of monomeric constituents. However, it is to be understood that the names so applied refer to the molecular structure of the polymer and are not limited to the polymers prepared by the polymerization of the specified monomers. In many instances polymers can be prepared from other monomers and coverted by subsequent chemical reaction to the desired anionic polymer as described herein.

Thus, the various polyanions of the types described herein can be termed "ethylenic" polymers, i.e., polymers prepared by "vinyl polymerization," that is, prepared by polymerization of at least one monoolefinic compound through aliphatic unsaturation, said polymers having numerous side chains distributed along a substantially linear continuous carbon atom chain. Moderate branching and cross-linking of this chain are permissible. The side chains can be all of one type or can be of different types so long as some contain anionic groups, e.g., carboxylic or sulfonic acid, or such groups or salts thereof, the number of such groups and the relative proportions of hydrophilic and hydrophobic groups being such as to provide a polymeric compound having a substantially large number of ionizable radicals giving rise to an anionic polymer molecule by electrolytic dissociation in water. The length of the said continuous carbon chain is great, and is preferably such as to provide polymers having a weight average molecular weight of at least 2,000. The continuous carbon chain is not easily broken because the carbon atoms therein enter into further reaction only with difficulty.

The polyanions employed in the present invention may be water-soluble to the extent that they form apparently true homogeneous solutions or mixtures with water, or they may be more difficultly soluble polymers which expand in the presence of water and dissolve at least to some extent, and even included are some which are apparently insoluble in distilled water but which are capable of combining with the clay or other ion-exchange type solid to be treated with such polymers. It will be understood, of course, that a polyanion such as a polymer containing free carboxylic acid groups while it may not per se be appreciably soluble in distilled water is included within the scope of the materials to be used inasmuch as its salt form is water-soluble as described herein and/or it is adsorbable or otherwise combinable per se with the inorganic solid.

Inasmuch as various procedures for effecting polymerization of ethylenically unsaturated monomers are so well-known in the art, it is not deemed necessary to go into much detail here. It will suffice to say that is possible to make polyanions whose adducts are suitable for the practice of the present invention by all of the various known polymerization techniques. These include mass or bulk polymerization, wherein the reaction mixture is free from added solvent or other reaction medium and consists solely of monomers, resultant polymers and catalyst, if any. Alternatively, the polymerization can be carried out in water solution in the case of water-soluble monomers, in organic solvents in which either monomer or polymer or both are soluble, or can be effected by the suspension or emulsion polymerization techniques. For suspension polymerization a reaction medium such as water is used together with a small amount of a suspending agent, for example water-soluble vinyl acetate/maleic anhydride copolymer derivatives, carboxymethylcellulose, etc., to give a suspension of particles of initial monomeric mixture which particles grow in size as the polymerization proceeds yet are not of such small size as to result in a permanently stable latex. This is called "pearl" polymerization where the particles are of quite large size. Emulsion polymerization can be effected by employing water, a sufficient amount of emulsifying agent, for example a water-soluble salt of a sulfonated long chain alkyl aromatic compound or a surface active condensation product of ethylene oxide with long chain aliphatic alcohols or mercaptans, etc., along with vigorous agitation whereby an emulsion of the reactants in water is formed and the product is obtained in the form of a latex. Such latex can then be coagulated if desired by known methods and the polymer separated from the water.

Suitable catalysts for polymerization include the "per" compounds and the "azo" compounds. Furthermore, many polymerizations can be effected in the absence of any added catalysts, or can be promoted by ultraviolet irradiation. The peroxide-type and the azo-type polymerization catalysts are of the free-radical promoting type. Peroxide catalysts can be inorganic or organic, the latter having the general formula R'OOR" wherein R' is an organic radical and R" is an organic radical or hydrogen. These compounds are broadly termed "peroxides" and in a more specific sense are hydroperoxides wherein R" is hydrogen. By way of example of "per" compounds can be mentioned benzoyl peroxide, ditert. butyl peroxide, tert.-butyl hydroperoxide, cumene hydroperoxide, lauroyl peroxide, hydrogen peroxide, potassium persulfate, perborates, etc. Azo-type polymerization catalysts are characterized by the presence in the molecule of the group —N=N—; the dangling valences can be attached to a wide variety of organic radicals with each one however being preferably attached to a tertiary carbon atom. By way of example can be mentioned $\alpha,\alpha'$-azodiisobutyronitrile, diazonium halides, etc.

The relative proportions of polyanion and ion-exchange solid to be used can be varied over a considerable range. Only a fraction of 1 percent of polyanion, based on the weight of the inorganic solid, is often sufficient to markedly affect the characteristics of the solid and to provide an adduct imparting valuable properties to organic plastics when incorporated therein. A preferred range of amounts is from 0.1 to 1 weight percent polyanion, based on the weight of clay or other inorganic solid, e.g., from 0.1 to 1 part by weight per 100 parts by weight inorganic solid. Many clays and other inorganic solids will effectively adsorb from a dilute aqueous solution from 0.1 to 0.3 weight percent polyanion before reaching an apparent point of saturation at which further adsorption occurs only slowly or not at all. Such adsorption, even in the presence of electrolytes, is comparatively slow to reach the saturation point, but the bulk of the adsorption occurs fairly quickly. As will be seen hereinafter, the adduct need not be made under conditions effecting direct evidence of such adsorption. Where adduct formation is effected in comparatively concentrated aqueous solutions of polyanion, and over comparatively short periods of time, it is considered likely that only some of the anionic groupings on a single polymer molecule may enter into direct combination with the clay or other inorganic solid by anionic exchange reaction, whereby a comparatively high weight of polymer becomes directly and firmly bound to the clay solid, approaching a theoretical limit where only one anion group on each polymer molecule would take up an anion exchange site on the clay. In some instances a comparatively high amount of organic material is desired in the adduct, and in such cases the proportion of polyanion can be well above 1 weight percent, ranging on up to 10 weight percent and even higher, based on the weight of inorganic solid.

In most instances the adduct is formed by simply slurrying the finely divided clay or other gel-forming solid having a high surface area and/or ion-exchange type of reaction in water together with the chosen polyanion. The polyanion may be completely water-soluble or its water-solubility may be considerably limited which is particularly the case with copolymers containing say 50 percent and above of non-ionic monomers in the polymer molecule. In the case of such copolymers it may be necessary in some instances, especially those with the smallest percentage of anionic groups in the molecule, to intimately admix the polymer with the clay particles in the presence of water as by ball-milling. Another effective method of preparing adducts from copolymers of the type described which are only slightly soluble in water is by a solvent-non-solvent system. Thus, for example, the polymer is dissolved in a suitable organic solvent, the clay is slurried in water, the two materials are brought together in the presence of an added hydrophilic organic solvent such as methanol or ethanol and with vigorous agitation, whereupon the adduct is formed and settles out. Suitable temperatures, concentrations, and times for effecting formation of the adducts will be greatly dependent upon the particular ion-exchange solid employed and the particular polyanion. It is usually desirable to employ temperatures well above room temperature, e.g., 50° C. and higher, and to provide several hours for sufficient interaction. Often it is sufficient to effect an intimate mixture of polyanion with the ion-exchange solid, and then dry the material at elevated temperatures, e.g., 100–150° C., for a period of several hours. The final product is termed the adduct, irrespective of whether all interaction between polyanion and solid occurred during the initial wet mixing procedure or partially during the heating required for drying. Quantities of water ranging from 2 to 50 times the weight of clay or other inorganic solid are usually sufficient. Those skilled in the art, having been given the benefit of the present disclosure, will readily be able to determine by simple tests suitable conditions for effecting the adduct formation in any given situation.

Regardless of the preparation method, the adducts should be used in the form of fine particles, preferably not larger than 100-mesh, i.e., not more than 1 percent retained on a No. 100 U.S. standard sieve. Drying of products made by wet methods usually causes formation of lumps, so that a final grinding step is desirable. The finished, isolated material is a non-aggregated finely divided pulverulent reaction product or adduct. In some instances it might be possible to use the adduct in other than finely divided form where the subsequent manufacturing step or steps, e.g., blending the adduct with rubber or plastics on a mill, results in breaking up of adduct particles so that it is ultimately in finely divided form. However, this is not a desirable procedure in most instances because it is generally true that the finer the particles the more effective the adduct. It is difficult and in some cases impossible to obtain sufficient dispersion of sufficiently fine particles on a mill to obtain the desired results. This is particularly true with rubber, where admixture of an aqueous suspension of very finely divided adduct with a rubber latex, followed by coagulation so the adduct particles and rubber particles are coprecipitated, gives a product in which the adduct shows marked reinforcing properties. In contrast the same adduct may be milled into rubber without its reinforcing properties being exhibited to as great an extent.

The adducts described herein are useful in organic plastic materials, both thermoplastic and thermosetting; see Hackh's Chemical Dictionary, 3rd edition, 1946 printing, pages 664–665, for a general definition and specific examples of a variety of plastics. Generally, the adducts serve as fillers and in some instances act as extenders or reinforcing agents and give marked improvements in physical properties. The adducts are more compatible with the plastics than untreated clays and thus are more readily dispersed therein. For example, adducts of the type disclosed in this application can be milled into, can be suspended in solutions or emulsions of, or can be present during the polymerization step leading to the formation of, vinyl polymers such as polystyrene, polymethyl methacrylate, polyvinyl chloride and related polymers and copolymers. The adducts can be incorporated into cellulosic plastics, e.g., cellulose nitrate or acetate, during or after formation of such plastics. The adducts can also be incorporated in thermosetting resins, being admixed with the resin prior to the time it is caused to harden by heating. Such resins are well-known and include urea-formaldehyde resins, melamine-formaldehyde resins, phenolic resins and the like.

The quantity of adduct to be used will depend upon the purpose of adding the adduct and will seldom exceed 50 weight percent of the final plastic-containing composition. The adduct may often be useful in amounts as low as 1 weight percent of the mixture.

Filled, extended and/or reinforced elastomers or rubbers are also products within the scope of the present invention. As used herein, the term "rubber" includes both natural rubber and synthetic rubbers. Particularly valuable synthetic rubbers are those prepared by polymerization of a monomeric material comprising a conjugated diolefin, e.g., butadiene, isoprene, chloroprene, etc. However, other synthetic rubbers, including silicone rubbers, are within the scope of the invention. Of particular interest for admixture with silicone rubbers are high surface area silicas treated with polyanions in accordance with procedures described herein. Copolymers of a major portion of butadiene with a minor portion of styrene, acrylonitrile, or other copolymerizable monomers now make up the great bulk of the synthetic rubber manufactured. Methods of making same and their properties are well-known to the art. Natural and synthetic rubbers for most uses require reinforcement. Preferably the commonest material used for this purpose is carbon black. However, this obviously gives a black rubber and where a white or light tinted rubber composition is required, there is great need for reinforcing agents other than carbon black. Also for many purposes considerable amounts of fillers can be used without adversely affecting the physical properties. Adducts of polyanions with clays, silicas, alumina, and other ion-exchange type solids as described herein are useful as fillers, extenders and/or reinforcing agents in rubbers. The adducts are incorporated with the rubber composition and other components of the final rubber mix on rubber mills, in Banbury mixers, or by other techniques common in the industry, but preferably by admixture with the latex followed by coprecipitation, as described herein. Ordinarily the final rubber mix is vulcanized. The quantity of adduct used will, of course, depend upon its properties in the rubber mix and the particular rubber, adduct and other ingredients to be used. The quantity may range from 1 part up to 50 parts by weight per 100 parts rubber. The adducts described herein can also be used as opacifiers, delustrants, and friction improvers in synthetic fibers, e.g., acrylic fibers, polyester fibers and the like.

Example 1 below describes a variety of preparations of polyanions and solutions thereof, all of which are suitable for use in preparing adducts to be employed in accordance with the invention. Examples 2, 3 and 4 present data on the effect of certain adducts on the properties of synthetic rubber. It will be understood that numerous changes can be made in polyanion, ion-exchange solid, plastic, proportions, and procedures without departing from the invention in its broadest aspects.

*Example 1*

Following are some of the various polyanions and methods of preparing same that can be used to make adducts with clays or other ion-exchange type solids as described herein.

*Vinyl acetate-monosodium maleate.*—Two grams of a copolymer of vinyl acetate-maleic anhydride having a specific viscosity of 2.1 (1 percent in cyclohexanone) was dissolved in 100 ml. of solution containing 0.43 gram of sodium hydroxide.

*Vinyl acetate-diammonium maleate.*—Two grams of a copolymer of vinyl acetate-maleic anhydride having a specific viscosity of 2.1 (1 percent in cyclohexanone) was dissolved in 100 ml. of solution containing 1.45 ml. of 28 percent ammonia solution.

*Vinyl acetate-ammonium maleamate.*—Vinyl acetate-maleic anhydride copolymer of specific viscosity of 2.1 (1 percent in cyclohexanone) was dissolved in anhydrous dioxane. Anhydrous ammonia gas was passed into the solution and a precipitate separated. The dioxane was decanted and the precipitate washed with absolute ether. Two grams of this polymer was dissolved in 100 ml. of water.

*Vinyl alcohol-sodium maleate.*—A vinyl formate-maleic anhydride copolymer was dissolved in hot water to give a 5 percent solution and a trace of hydrochloric acid added. The lactone of the vinyl alcohol-maleic acid copolymer separated as a rubbery material. The lactone was dissolved in sodium hydroxide solution to give a 2 percent solution of vinyl alcohol-sodium maleate.

*Vinyl methyl ether-diammonium maleate.*—Two grams of a copolymer of vinyl methyl ether-maleic anhydride of specific viscosity of 11.8 (1 percent in cyclohexanone) was dissolved in 100 ml. of solution containing 1.7 ml. of concentrated ammonia solution.

*Vinyl ethyl ether-diammonium maleate.*—Two grams of a copolymer of vinyl ethyl ether-maleic anhydride of specific viscosity of 2.1 (1 percent in cyclohexanone) was dissolved in 100 ml. of a solution containing 1.5 ml. of concentrated ammonia solution.

*Isobutylene-diammonium maleate.*—Two grams of a copolymer of isobutylene-maleic anhydride of specific viscosity of 0.83 (0.2 percent in dimethylformamide) was dissolved in 100 ml. of a solution containing 1.7 ml. of concentrated ammonia solution.

*Styrene-diammonium maleate.*—Two grams of styrene-maleic anhydride copolymer was dissolved in 100 ml. of a solution containing 1.3 ml. of concentrated ammonia solution.

*Ethyl acrylate-diammonium maleate.*—Two grams of a copolymer of ethyl acrylate-maleic anhydride was dissolved in 100 ml. of solution containing 1.3 ml. of concentrated ammonia solution.

*Vinyl acetate-maleic acid-½ calcium salt.*—Two grams of a copolymer of maleic anhydride and vinyl acetate and 0.4 gram of calcium hydroxide were added to 100 ml. of water and agitated until solution was complete.

*Vinyl acetate-diammonium maleate.*—Two grams of a copolymer of vinyl acetate-maleic anhydride having a specific viscosity of 4.75 (1 percent in cyclohexanone) was dissolved in 100 ml. of solution containing 1.45 ml. of 28 percent ammonia solution.

*Isopropenyl acetate-diammonium maleate.*—Two grams of a copolymer of isopropenyl acetate-maleic anhydride having a specific viscosity of 19.3 (1 percent in cyclohexanone) was dissolved in 100 ml. of solution containing 1.35 ml. of 38 percent ammonia solution.

*Vinyl n-butyl ether-diammonium maleate.*—Two grams of a copolymer of vinyl n-butyl ether-maleic anhydride having a specific viscosity of 3.07 (1 percent in cyclohexanone) was dissolved in 100 ml. of solution containing 1.4 ml. of 28 percent ammonia solution.

*Vinyl chloride-diammonium maleate.*—Two grams of a copolymer of vinyl chloride-maleic anhydride having a specific viscosity of 0.95 (1 percent in cyclohexanone) was dissolved in 100 ml. of solution containing 1.6 ml. of 28 percent ammonia solution.

*Vinyl acetate-maleic acid, partial methyl ester, ammonium salt.*—Two grams of a terpolymer of vinyl acetate (1 mole), monomethyl maleate (0.08 mole), and maleic anhydride (0.92 mole) having a specific viscosity of 10.3 (1 percent in cyclohexanone) was dissolved in 100 ml. of solution containing 1.25 mole of 28 percent ammonia solution.

*Sodium polyacrylate-vinyl alcohol copolymer.*—Ten grams of a finely ground copolymer of acrylonitrile (95 percent) and vinyl acetate (5 percent) having a specific viscosity of 0.28 (0.1 percent solution in dimethylformamide) was suspended in a solution of 0.1 gram of stearic acid and 7 grams of sodium hydroxide in 400 ml. of water. The suspension was stirred and refluxed for 10 hours, during which time the polymer dissolved because of the hydrolysis of nitrile to amide and carboxylic acid sodium salt groups. The resultant solution was adjusted to a pH of 8 by the addition of a small amount of hydrochloric acid and the solution diluted with water to 500 ml. total volume.

*Sodium polymethacrylate.*—Fifty grams of polymethacrylic acid having a specific vicosity of 1.25 (0.4 percent solution in dimethylformamide) and 17.5 grams of sodium hydroxide were dissolved in a liter of water.

*Ammonium polyacrylate.*—Two grams of polyacrylic acid having a specific viscosity of 8.3 (0.4 percent solution in water) was dissolved in 98 ml. of water containing 2.8 ml. of concentrated aqueous ammonia.

*Sodium polyacrylate.*—Twenty grams of the above polyacrylic acid was dissolved in 980 ml. of water containing 11 grams of sodium hydroxide.

*Acid hydrolysis of methacrylic acid (50%)-acrylonitrile (50%) copolymer.*—Two grams of a copolymer of methacrylic acid (50%) and acrylonitrile (50%) was added to a solution of 15 ml. of water and 50 ml. of concentrated sulfuric acid. After several days the thick solution was diluted with water and heated to separate a polyacid which still contained 44 percent of the original nitrogen. Two grams of dried polymer was dissolved in 100 ml. of solution containing 1 ml. of 28 percent ammonia solution.

The acid hydrolysis method was applied to the following polymers: acrylonitrile (95%)-vinyl acetate (5%), acrylonitrile (98%)-vinyl acetate (2%), acrylonitrile (80%)-methacrylonitrile (20%), acrylonitrile (84%)-methacrylonitrile (11%)-vinyl acetate (5%), acrylonitrile (70%)-methacrylic acid (30%), and polyacrylonitrile.

*Example 2*

A dry mixture was prepared of 497.5 grams standard "Volclay" bentonite of 325-mesh particle size and 2.5 grams sodium polyacrylate prepared by hydrolysis of polyacrylonitrile. The dry mixture was then slurried in 14 liters distilled water, with vigorous agitation. The resulting slurry, containing 3.45 weight percent solids, was quite thick. After standing for 5 days, the slurry was drum-dried. The product from the drum dryer was still somewhat moist and drying was completed in an oven at 90° C. for 24 hours. The product was ground in a Mikro-Pulverizer (fine screen).

This clay-polyanion adduct was tested as filler in GR-S-100 synthetic rubber (butadiene/styrene copolymer prepared by emulsion polymerization at subatmospheric temperatures). The adduct was milled into the dry rubber stock on a 6-inch x 12-inch National Rubber Machinery mill and the various compounding ingredients were also milled in.

For testing the following A.S.T.M. procedures were utilized.

Milling and curing, A.S.T.M., D15-50T
Stress-strain, A.S.T.M., 412-49T

| Base formula: | Parts by weight |
|---|---|
| GR-S-100 | 100.0 |
| Zinc oxide | 5.0 |
| Stearic acid | 2.0 |
| Sulfur | 1.75 |
| Santocure* | 1.2 |

| Description | Amount, Pts. by Wt. | Stress—Strain Data | | | | |
|---|---|---|---|---|---|---|
| | | Min. Cure at 144° C. | 300% Modulus, p.s.i. | 500% Modulus, p.s.i. | Ultimate Tensile Strength, p.s.i. | Ultimate Elongation, Percent |
| Control | | 30 | (a) | | | |
| | | 60 | 100 | 160 | 245 | 700 |
| | | 90 | 170 | | 210 | 366 |
| Bentonite | 30.0 | 30 | (a) | | | |
| | | 60 | (b) | | | |
| | | 90 | 170 | 226 | 356 | 833 |
| Adduct | 30.0 | 30 | (a) | | | |
| | | 60 | 110 | 110 | 469 | 1,200+ |
| | | 90 | 193 | 273 | 273 | 593 |

*Santocure = N-cyclohexyl-2-benzothiazyl sulfenamide ("Santocure" is a trademark).
(a) = No cure.
(b) = Partial cure.

It will be noted that the bentonite alone gave only a partial cure at 60 minutes, making it impossible to determine physical characteristics on the 60-minute cured material, whereas the rubber with the adduct did cure in 60 minutes. The adduct showed no important increase in modulus over the control, and slight increase in modulus over the bentonite-containing sample based on 90 minutes cure. The adduct showed the greatest advantage in the ultimate tensile strength and the ultimate elongation, both of these values at 60-minute cures being much higher than for the control and much higher than those obtained for the 90-minute cure with bentonite. The lower values for ultimate tensile strength and ultimate elongation for the adduct-containing sample as compared with the bentonite-containing sample when comparing each on the basis of 90 minutes cure indicates that 60 minutes is a better curing time for the adduct-containing rubber than 90 minutes.

*Example 3*

The adduct described in Example 2 was coprecipitated with GR-S type IV synthetic rubber. A dilute water slurry of the adduct was added to dilute (10 percent solids) GR-S type IV latex and the mixture was then coagulated with 40 percent calcium nitrate. The resulting coagulum was washed and dried thoroughly before being mixed with compounding ingredients on the mill.

The A.S.T.M. test procedures described with reference to Example 2 were utilized.

Base formula: | Parts by weight
--- | ---
Rubber as GR-S type IV coagulum | 100.0
Rayox (TiO$_2$) | 50.0
Zinc oxide | 5.0
Sulfur | 1.5
Santocure* | 1.2

| Description | Amount, Pts. by Wt. | Stress—Strain Data ||||| 
|---|---|---|---|---|---|---|
| | | Min. Cure at 144° C. | 300% Modulus, p.s.i. | 500% Modulus, p.s.i. | Ultimate Tensile Strength, p.s.i. | Ultimate Elongation, Percent |
| Control | | 30 | 420 | 685 | 1,320 | 700 |
| | | 60 | 450 | 813 | 1,636 | 680 |
| | | 90 | 490 | 885 | 1,570 | 655 |
| Bentonite | 23 | 30 | 460 | 510 | 800 | 983 |
| | | 60 | 603 | 720 | 1,120 | 833 |
| | | 90 | 756 | 910 | 1,260 | 716 |
| Adduct | 23 | 30 | 916 | | 1,046 | 426 |
| | | 60 | 1,443 | | 1,546 | 350 |
| | | 90 | | | 1,570 | 270 |

*Santocure = N-cyclohexyl-2-benzothiazyl sulfenamide ("Santocure" is a trademark).

The reinforcing ability of the adduct is striking in the above data. Thus, comparing the 300% modulus at 60-minute cure for the control, the bentonite-containing material, and the adduct-containing material, it is seen that the bentonite increases the modulus somewhat, while the adduct increases it more than three-fold. This is accomplished with only a very slight loss in ultimate tensile strength, whereas the ultimate tensile strength of the bentonite-containing sample was quite markedly less than that of the control.

*Example 4*

An adduct similar to that employed in Examples 2 and 3 was prepared as follows: An acrylic acid polymer was prepared by caustic hydrolysis of polyacrylonitrile by an alcohol slurry process. The polyacrylonitrile had been prepared by suspension-emulsion polymerization. It was admixed with alcoholic (ethyl alcohol) sodium hydroxide, and the mixture heated to boiling for a period of about 3 hours, resulting in liberation of ammonia. During this hydrolysis the polymer changed from a white to a yellow solid. The material was then filtered and the resulting hydrolyzed polyacrylonitrile dried, ground and screened.

The adduct was prepared by dry mixing 11.8 pounds of "Volclay" bentonite with 22.8 grams of the hydrolyzed polyacrylonitrile described in the preceding paragraph. The dry mixture was then slurried with 45 gallons of water in a 125-gallon kettle. The resulting slurry could not be filtered, and was charged directly to a vacuum pan drier and dried for about 40 hours at a final temperature of about 120° C.

The adduct analyzed as follows:

Water, percent | 2.41
--- | ---
Carbon, percent | 0.68
Nitrogen, percent | 0.12
Milliequivalents, monomer units per 100 grams clay, based on carbon | 5.0

An aqueous slurry of the adduct was mixed with GR-S type III latex (10 percent solids), the mixture coagulated with a 40 percent alcoholic calcium nitrate solution, and the coagulum washed and dried. Thereafter the other compounding ingredients were added to the dried polymer-adduct mixture in the usual manner on the mill. The A.S.T.M. tests described in the preceding examples were used. One hundred parts by weight coagulated rubber and 30 parts by weight adduct (or bentonite in one test) were used, dry basis.

Base formula: | Parts by weight
--- | ---
Rubber/clay coagulum | 130.0
Rayox (TiO$_2$) | 50.0
Zinc oxide | 5.0
Sulfur | 1.5
Santocure* | 1.2

| Description | Amount, Pts. by Wt. | Stress—Strain Data ||||| 
|---|---|---|---|---|---|---|
| | | Min. Cure at 144° C. | 300% Modulus, p.s.i. | 500% Modulus, p.s.i. | Ultimate Tensile Strength, p.s.i. | Ultimate Elongation, Percent |
| Control | | 30 | 380 | 426 | 450 | 700 |
| | | 60 | 613 | 840 | 1,100 | 686 |
| | | 90 | 746 | 1,096 | 1,336 | 596 |
| Bentonite | 30 | 30 | (a) | | | |
| | | 60 | 463 | 616 | 1,140 | 840 |
| | | 90 | 445 | 675 | 1,300 | 735 |
| Adduct | 30 | 30 | | | 1,193 | 286 |
| | | 60 | | | 1,513 | 283 |
| | | 90 | | | 1,570 | 283 |

*Santocure = N-cyclohexyl-2-benzothiazyl sulfenamide ("Santocure" is a trademark).
(a) = No cure.

The adduct had extremely good reinforcing properties, as evidenced by the fact that the rubber compound containing adduct had an ultimate elongation of less than 300 percent. Thus, a value could not be obtained for 300 percent modulus but such value, if obtainable, would of course have been greater than the value for the ultimate tensile strength (1513 p.s.i.). This is in marked contrast to the control which had a 300 percent modulus (60-minute cure) of 613 pounds per square inch and the bentonite (60-minute cure) whose 300 percent modulus was even less, i.e., 463 pounds per square inch.

While the invention has been described herein with particular reference to various preferred embodiments thereof, it will be appreciated that variations from the details given herein can be effected without departing from the invention in its broadest aspects.

I claim:

1. A high molecular weight polymeric organic material selected from the group consisting of natural and synthetic rubbers and thermoplastic and thermosetting resins, modified in properties by treatment with an adduct of a high surface area hydrophilic substance possessing ion-exchange properties with from 0.1 to 10 weight percent (based on said substance) of an anionic synthetic high polymer containing a substantially linear molecular chain derived by the polymerization of at least one mono-olefinic compound through aliphatic unsaturation.

2. A composition according to claim 1 wherein said high molecular weight polymeric organic material is natural rubber, and said adduct is intimately dispersed therein.

3. A composition according to claim 1 wherein said high molecular weight polymeric organic material is a synthetic rubber, and said adduct is intimately dispersed therein.

4. A composition according to claim 2 wherein said synthetic rubber comprises a diolefin polymer synthetic rubber.

5. A composition according to claim 2 wherein said synthetic rubber comprises a silicone rubber.

6. A composition comprising an intimate admixture of a high molecular weight polymeric organic material selected from the group consisting of natural and synthetic rubbers and thermoplastic and thermosetting resins, with an adduct of a clay with from 0.1 to 10 weight percent (based on said clay) of an anionic synthetic high polymer containing a substantially linear molecular chain derived by the polymerization of at least one monoolefinic compound through aliphatic unsaturation.

7. A composition comprising an intimate admixture of a high molecular weight polymeric organic material selected from the group consisting of natural and synthetic rubbers and thermoplastic and thermosetting resins, with an adduct of a high surface area hydrophilic substance possessing ion-exchange properties with from 0.1 to 10 weight percent (based on said substance) of an anionic synthetic high polymer containing a substantially linear molecular chain derived by the polymerization of at least one monoolefinic compound through aliphatic unsaturation, the quantity of said adduct not exceeding 50 weight percent of said composition.

8. A composition according to claim 5 wherein said substance is a clay mineral.

9. A composition according to claim 5 wherein said substance is a bentonite.

10. A composition according to claim 5 wherein said substance is a kaolinite.

11. A composition according to claim 5 wherein said substance contains alumina.

12. A composition according to claim 5 wherein said anionic polymer contains a plurality of carboxyl groups in the molecule.

13. A composition according to claim 5 wherein said anionic polymer has a molecular weight of at least 10,000.

14. A composition according to claim 5 wherein said high molecular weight polymeric organic material is a synthetic polymer.

15. A composition according to claim 5 wherein said high molecular weight polymeric organic material is a solid thermoplastic resin.

16. A composition according to claim 5 wherein said high molecular weight polymeric organic material is a thermosetting resin.

17. A composition according to claim 5 wherein said anionic polymer contains a plurality of acrylic units.

18. A composition according to claim 17 wherein said anionic polymer is a water-soluble salt of a polyacrylic acid.

19. A composition according to claim 17 wherein said anionic polymer is a hydrolyzed polyacrylonitrile.

20. A reinforced synthetic rubber prepared by making a mixture of (a) an aqueous latex of a synthetic rubber prepared by emulsion polymerization of a major proportion of butadiene and a minor proportion of styrene and (b) an adduct of a high surface area hydrophilic substance possessing ion-exchange properties with from 0.1 to 10 weight percent (based on said substance) of an anionic synthetic high polymer containing a substantially linear molecular chain derived by the polymerization of at least one monoolefinic compound through aliphatic unsaturation, coprecipitating the butadiene/styrene rubber and the adduct from said mixture, and separating the thus-coprecipitated solids from aqueous phase.

21. A rubber according to claim 20 wherein the coprecipitated solids are subjected to vulcanization.

22. A rubber according to claim 20 wherein said adduct is prepared from a clay mineral and from 0.1 to 10 weight percent (based on the mineral) of an anionic polymer containing a plurality of carboxyl groups in the molecule.

23. A rubber according to claim 22 wherein said adduct contains in the neighborhood of 0.5 weight percent of caustic hydrolyzed polyacrylonitrile.

References Cited in the file of this patent

UNITED STATES PATENTS

| | | |
|---|---|---|
| 2,500,727 | Whittaker | Mar. 14, 1950 |
| 2,531,396 | Carter et al. | Nov. 28, 1950 |
| 2,625,529 | Hedrick et al. | Jan. 13, 1953 |

UNITED STATES PATENT OFFICE
CERTIFICATE OF CORRECTION

Patent No. 2,883,356                                  April 21, 1959

Earl W. Gluesenkamp

It is hereby certified that error appears in the above numbered patent requiring correction and that the said Letters Patent should read as corrected below.

Column 15, lines 1 and 4, for the claim reference numeral "2", each occurrence, read -- 3 --; same column 15, lines 27, 29, 31, 33, 35, 38, 40 and 43, and column 16, lines 3 and 6, for the claim reference numeral "5", each occurrence, read -- 7 --.

Signed and sealed this 7th day of December 1965.

(SEAL)
Attest:

ERNEST W. SWIDER                                        EDWARD J. BRENNER
Attesting Officer                                           Commissioner of Patents